United States Patent [19]
Langelin et al.

[11] Patent Number: 6,099,814
[45] Date of Patent: *Aug. 8, 2000

[54] METHOD FOR PROCESSING ACID EFFLUENTS

[75] Inventors: Henri René Langelin, Caffiers; Simon Colombier, Saint-Germain-les-Corbeil, both of France

[73] Assignee: Lloist Recherche et Developpement S.A., Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/793,604
[22] PCT Filed: Sep. 22, 1995
[86] PCT No.: PCT/BE95/00087
    § 371 Date: May 28, 1997
    § 102(e) Date: May 28, 1997
[87] PCT Pub. No.: WO96/09251
    PCT Pub. Date: Mar. 28, 1996

[30] Foreign Application Priority Data

Sep. 22, 1994 [BE] Belgium .................................. 9400859

[51] Int. Cl.[7] ........................................................ C01F 5/40
[52] U.S. Cl. .......................... 423/161; 210/710; 210/712; 210/718; 210/724; 210/726; 423/169; 423/243.08; 423/554

[58] Field of Search ................................ 210/710, 712, 210/716, 718, 724, 726, 737, 743, 738; 423/158, 161, 169, 243.08, 554

[56] References Cited

U.S. PATENT DOCUMENTS

| | | | |
|---|---|---|---|
| 1,765,424 | 6/1930 | Hageman et al. | 210/724 |
| 3,617,560 | 11/1971 | Deul et al. | 210/716 |
| 3,637,347 | 1/1972 | Jonakin et al. | 23/122 |
| 3,904,742 | 9/1975 | Akimoto | 423/554 |
| 4,388,283 | 6/1983 | Abrams et al. | 423/242 |
| 5,282,977 | 2/1994 | Schinkitz | 210/724 |

*Primary Examiner*—Peter A. Hruskoci
*Attorney, Agent, or Firm*—Charles D. Gunter, Jr.

[57] ABSTRACT

In the method for the humid treatment of effluents containing a compound selected from the group consisting of $H_2SO_4$, free $SO_2$, $SO_3^-$, or $SO_4^=$ and having a pH lower than 5, the effluents are reacted with a basic compound. Particles selected from the group consisting of $CaCO_3.MgCO_3$, $MgCO_3$ and a mixture of these, are used for treating the said effluents, the said particles having a particle size such that at least 95% of the particles selected from the group consisting of $CaCO_3.MgCO_3$ and $MgCO_3$ have a particle size smaller than 75 $\mu$m. After treatment magnesium sulfate in the form of a solution or brine is recovered.

36 Claims, 2 Drawing Sheets

METHOD FOR PROCESSING ACID EFFLUENTS

THE PRIOR ART

This application is a 371 of PCT/BE95/00087 filed Sep. 22, 1995.

The present invention relates to a humid method for the treatment of effluents containing sulfric acid, free $SO_2$, $SO_3^-$, or $SO_4^-$.

These effluents come for example from the washing steps of fumes or flue gases by means of water.

These liquid effluents contain sulfuiric acid and consequently may not be discharged in rivers. Until now, these effluents have been treated by means of $CaCO_3$ or lime, producing gypsum $CaSO_4.xH_2O$ as by-product, in other words producing mountains of waste material that have to be stocked or spread.

This invention aims to avoid this disadvantage, but also enables the recovery of a valorizable by-product namely magnesium sulfate.

BRIEF DESCRIPTION OF THE INVENTION

The method according to the invention is a humid method for treating effluents containing $H_2SO_4$, free $SO_2$, $SO_3$, or $SO_4^-$ and having a pH lower than 5, in which these effluents are reacted with a basic compound. In the method according to the invention, particles of $CaCO_3.MgCO_3$, $MgCO_3$ or a mixture of these, possibly mixed with $CaCO_3$ are used for treating the said effluents, the said particles having a particle size such that at least 95%, preferably about 100% of the particles of $CaCO_3.MgCO_3$ and/or $MgCO_3$ have a particle size smaller than 75 μm. After treatment, magnesium sulfate in the form of a solution or brine is recovered.

Preferably, in order to obtain a very efficient treatment, the said particles of $CaCO_3.MgCO_3$ and/or $MgCO_3$ have a particle size such that the median diameter $d_{50}$ (50% in weight of the particles having a particle size greater than the said median diameter) is between 3 and 30 μm, in particular between 5 and 20 μm, and is more specifically about 10 μm.

Tests have shown that, by using particles of $CaCO_3$ and of dolomite of particle size greater than 100 μm, a slow and therefore non-industrial neutralization of acid solutions was obtained. Such particles are therefore not suitable for valorizing acid liquid effluents by producing magnesium sulfate brine or $MgSO_4.xH_2O$.

Other tests have shown that the use of particles of $CaCO_3$ and of dolomite with a too fine particle size (less than 3 μm) for the industrial neutralization of acid liquid effluents was to be proscribed due to the costs of the crushing operation, the small gain in neutralization time, the dosage problems and therefore the risks of using quantities of dolomite in excess, in other words risks of discharging unreacted particles of dolomite when separating the liquid phase containing magnesium sulfate.

Furthermore, the mixing of too fine solid particles of dolomite with liquid effluents is difficult and creates problems.

It has now been observed that particles of $MgCO_3$ or of dolomite with a well-determined particle size are to be used for ensuring an optimum industrial treatment.

Because the particles used in the method according to the invention have an optimum particle size, they can easily be mixed and dispersed in the acid solution (substantially homogeneous dispersion), so that the substantially "homogeneous" formation of a gaseous phase in the solution (formation of a gaseous phase as well in the upper layers as in the lower layers of the solutions to be neutralized) will improve the mixing of the particles, and lead to a better solid\liquid contact and thus a better reaction.

The particles of $MgCO_3$ and/or $CaCO_3.MgCO_3$ used in the method according to the invention advantageously have a wide particle size distribution. Their distribution factor at 80%, and even at 90% is preferably greater than 1.5, in particular greater than 1.9 (for example about 2).

The particle size factors at 90% and 80% are calculated as follows:

$$F_{90\%} = \frac{\emptyset_{90\%} - \emptyset_{10\%}}{(\emptyset_{90\%} + \emptyset_{10\%})/2}$$

$$F_{80\%} = \frac{\emptyset_{80\%} - \emptyset_{20\%}}{(\emptyset_{80\%} + \emptyset_{20\%})/2}$$

in which $\emptyset_{x\%}$ is the upper diameter of the particles of the weight fraction passing at x%

According to one embodiment, the effluents are neutralized in two steps, for example by using in each of the said steps dolomite with a ratio of particles passing at 60 μm greater than 90%, and less than 30% of particles passing at 3 μm.

According to one embodiment, the acid effluents are treated in a first step by means of particles of $CaCO_3.MgCO_3$ and/or $MgCO_3$ and in a second step by means of an oxide and/or hydroxide of alkaline metal or alkaline-earth metal, in particular CaO.MgO and/or MgO.

This oxide and/or hydroxide can be a sodium derivative such as sodium bicarbonate, but is preferably selected from $Ca(OH)_2$, $Mg(OH)_2$, CaO, MgO, CaO.MgO, $Ca(OH)_2.Mg(OH)_2$ or a mixture of these, milks of lime ($Ca(OH)_2$; $Mg(OH)_2$; $Ca(OH)_2.Mg(OH)_2$).

For example, the effluents are treated in the first step until a pH between 3 and 5 is reached and in the second step until a pH greater than 6, preferably greater than 7, is reached.

The quantity of this oxide and/or hydroxide is advantageously less than 15%, preferably lower than or equal to 10% of the quantity of $CaCO_3.MgCO_3$ and/or $MgCO_3$ possibly mixed with $CaCO_3$ used in the first step.

The use of this oxide and/or hydroxide allows a rapid neutralization of the already pre-neutralized effluent, for example already pre-neutralized to a pH of 5.

In a particularly preferred embodiment, acid effluents ($H_2SO_4$) are neutralized in two steps, namely:

until a pH of 3 to 5, and even 6, by means of particles of crushed dolomite with a ratio of particles passing at 70 μm greater than 95% and a d50 from 6 to 15 μm, and by means of an oxide and/or hydroxide of alkaline metal or alkaline-earth metal, preferably MgO or MgO.CaO until a desired final pH, particularly a neutral pH.

The use of MgO, MgO.CaO and burned dolomite in the last step allows to obtain solutions with a high concentration of $MgSO_4$ or $MgSO_4$ brines.

The $MgSO_4$ solutions or brines can be concentrated by various techniques, such as evaporation or membrane techniques such as inverse osmosis.

These solutions or brines can thus be used for the preparation of magnesium sulfate in solid form, particularly in the form of an hydrate $MgSO_4.xH_2O$.

EXAMPLES OF TREATMENT

Characteristics and details of the invention will appear from the description of the following examples:

Example 1 (Comparative)

A solution containing 100 g/l of $H_2SO_4$ was neutralized by means of crushed $CaCO_3$ in the form of aggregates (particle size>1 cm).

The quantity of $CaCO_3$ used was ±130 g per liter of solution. This neutralization reaction was fast and gave as reaction product a suspension containing ±170–175 g of calcium sulfate dihydrate/liter.

The neutralization reaction can be represented as follows:

$$CaCO_3 + H_2SO_4 + 2H_2O \rightarrow CaSO_4 \cdot 2H_2O(s) + CO_2\uparrow + H_2O.$$

This suspension is then put into decantation ponds where mountains of gypsum are formed.

In order to obtain a 90% neutralization, the neutralization was carried out during ±225 minutes.

With such a particle size, a complete neutralization requires a large excess of $CaCO_3$. Moreover, this neutralization is very slow. The same conclusions where drawn by using $MgCO_3$ (particle size >1 cm) instead of $CaCO_3$.

Example 2 (Comparative)

A solution containing 100 g/l of $H_2SO_4$ was neutralized by means of dolomite with a particle size greater than 1 cm. ±180 g of dolomite were added per liter of solution in order to obtain a 90% neutralization in about 200 minutes.

In fact the magnesium carbonate did not or almost not react with the sulfric acid.

Example 3

A solution containing 100 g/l of $H_2SO_4$ was neutralized by means of dolomite crushed in order to have the following characteristics: average diameter=10 μm ($d_{50}$); fraction passing at 70 μm: ±100%; fraction passing at 40 μm ($\emptyset_{90\%}$): ±90%; fraction passing at 30 μm ($\emptyset_{80\%}$):80%; fraction passing at 1 μm ($\emptyset_{10\%}$): 10%; fraction passing at 2 μm ($\emptyset_{20\%}$): 20%; particle size distribution factor at 90%:

$$\frac{\emptyset_{90\%} - \emptyset_{10\%}}{(\emptyset_{90\%} + \emptyset_{10\%})/2} = \frac{40-1}{(40+1)/2} = +/- 2$$

particle size distribution factor at 80%:

$$\frac{\emptyset_{80\%} - \emptyset_{20\%}}{(\emptyset_{80\%} + \emptyset_{20\%})/2} = \frac{30-2}{(30+2)/2} = +/- 2$$

in other words a wide or widespread distribution.

±90 g of dolomite were added per liter in less than 50 minutes in order to obtain a neutralization over 90%.

The neutralization can be schematized as follows:

$$CaCO_3 \cdot MgCO_3 + 2H_2SO_4 + 2H_2O \rightarrow CaSO_4 \cdot 2H_2O(solid) + 2CO_2\uparrow + MgSO_4(solution) + 2H_2O.$$

The gypsum formed was separated by filtration from a solution of magnesium sulfate. ±86 g of $CaSO_4 \cdot 2H_2O$ per liter of solution treated and a solution containing ±65 g/l of $MgSO_4$ were thus recovered.

This solution was evaporated in order to obtain magnesium sulfate dihydrate.

Compared to example 1, the quantity of gypsum was twice as low.

Figure 2:
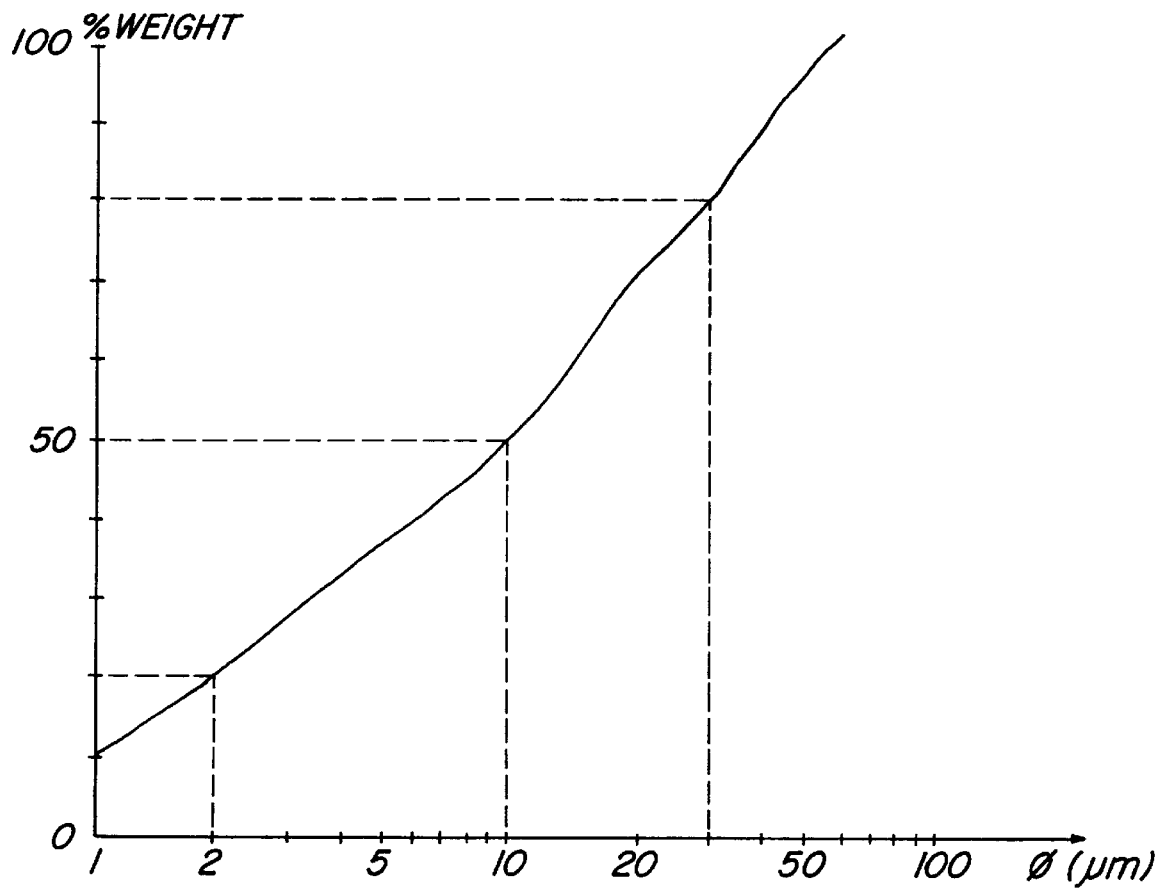
FIG. 2 gives the weight % of the passing fraction of particles versus particle diameter.

FIG. 2 attached gives the % of the passing fraction versus diameter (particle size curve) of the particles of dolomite used. As it can be seen from this figure, the particle size factor at 90%, at 80%, at 70%, but even at 60% is to a considerable extent constant (±2), i.e. the particles are well distributed according to their size.

Example 4

Example 3 was repeated, except that, after the reaction with the dolomite, 10 g of CaO.MgO were added per liter of solution in order to ensure a complete neutralization.

Example 5

Example 3 was repeated, except that, after the reaction with the dolomite, 10 g of $Ca(OH)_2$ were added per liter of solution.

Example 6

Example 3 was repeated except that, after the reaction with the crushed dolomite, 7 g of CaO.MgO were added per liter of solution.

Example 7

Example 3 was repeated, except that, burned dolomite was used at the end of neutralization by means of dolomite.

Figure 1:
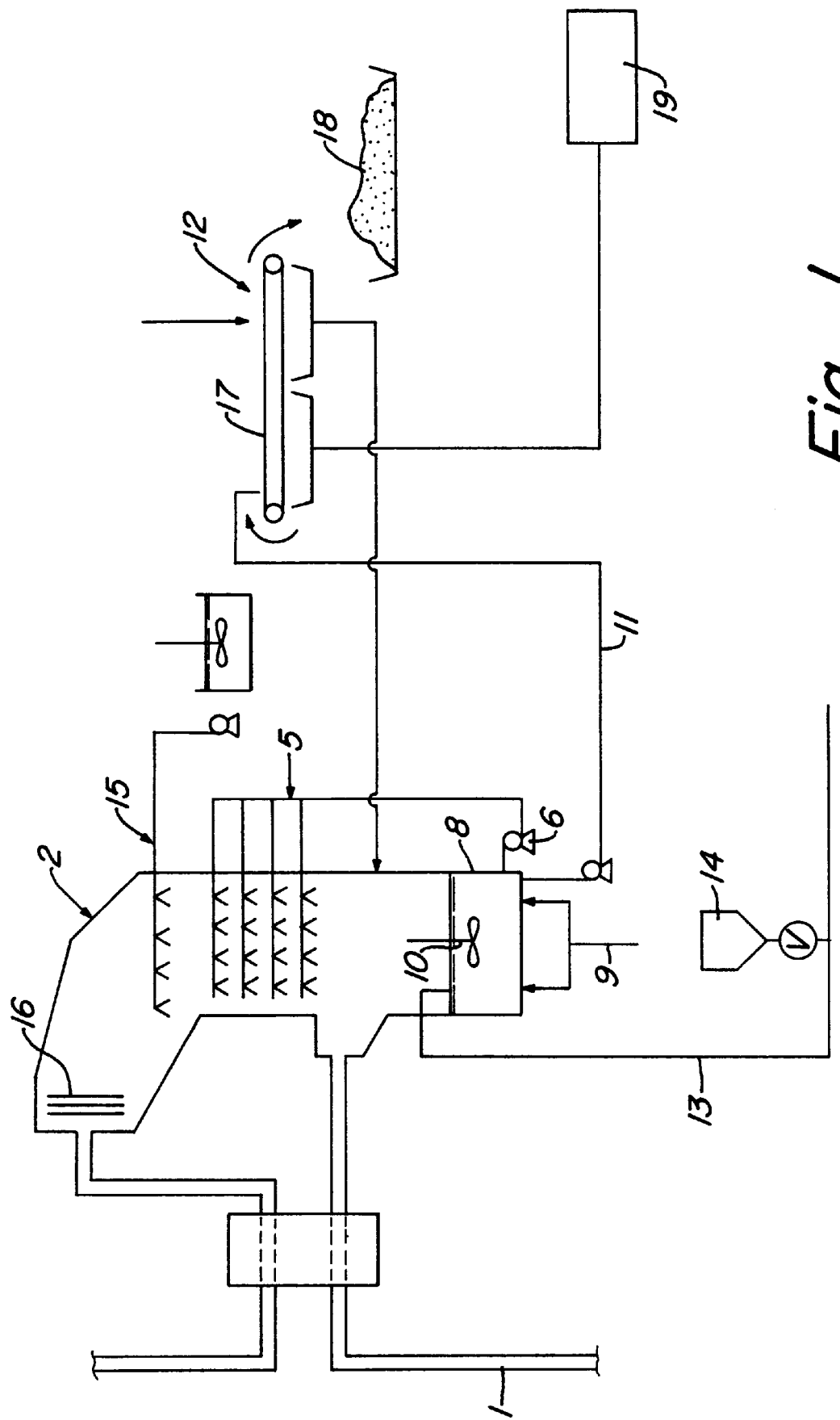
FIG. 1 is a schematic view of an installation for treating fumes or flue gases in accordance to the invention.

A treatment installation according to the invention is represented in FIG. 1.

This installation comprises an intake 1 for fumes or flue gases to be treated 1 towards a treatment unit 2, an outlet 3 for the treated fumes leaving the unit 2, advantageously a heat exchanger 4 reducing the temperature of fumes to be treated and heating the treated fumes, a system 5 with a pump 6 and a device 7 for spraying an aqueous solution containing neutralizing agents, a tank 8 located below the unit 4 for collecting a treatment liquid, a system 9 for mixing the liquid contained in the tank 8 by injection of air or oxygen, a mixer 10, a pipe 11 for drawing off liquid out of the tank 8 to a solid/liquid separation unit 12, a pneumatic device 13 for bringing crushed $CaCO_3 \cdot MgCO_3$ (from tank 14) to the tank 8, a system 15 for spraying a milk of lime ($Ca(OH)_2$-$Mg(OH)_2$) in the fumes treated by means of $CaCO_3 \cdot MgCO_3$, which falls after the reaction into the tank 8, filters 16 in order to recover particles possibly carried by the fumes.

The liquid phase containing the magnesium sulfate is recycled (pump 6) at the head of the process for enrichment up to a concentration "Ci" close to the saturation in $MgSO_4$ at the treating temperature. After n recyclings, the mother solution with the concentration Ci is directed toward a crystallization installation 12 for the producing of valorizable by-product $MgSO_4 \cdot xH_2O$ or the mother solution is partly directed toward the installation 12. The temperature of this liquid phase is advantageously maintained below 90° C., preferably between 50 and 90° C. (for example 75° C.). Moreover the liquid phase is advantageously subjected to a bubbling of a gaseous phase containing $O_2$, for example air (bubbling unit 9). This bubbling allows to maintain the temperature of the liquid phase below a maximum determined temperature and to ensure the conversion of $Mg(HSO_3)_2$ into $MgSO_4$.

The unit 12 comprises a band filter 17 allowing to recover a liquid phase rich in $MgSO_4$. The gypsum $CaSO_4 \cdot 2H_2O$ remains on the band filter 17 by which it is conducted to a discharge or storage area 18 and on which it is possibly washed by water. The liquid phase rich in $MgSO_4$ is sent towards an $MgSO_4.x\ H_2O$ crystallization installation 19. If this installation allows only a partial crystallization of the $MgSO_4.x\ H_2O$, it comprises a liquid phase recirculation system containing non-crystallized $MgSO_4$.

The liquid phase coming from the washing is advantageously recycled towards the tank 8.

What we claim is:

1. Method for the wet treatment of effluents containing a compound selected from the group consisting of $H_2SO_4$, free $SO_2$, $SO_3^-$, or $SO_4^=$ and having a pH lower than 5, in which these effluents are reacted with particles selected from the group consisting of $CaCO_3.MgCO_3$, $MgCO_3$, and mixtures thereof, to neutralize said effluents and form magnesium sufate, the said particles having a particle size such that at least 95% of the particles selected from the group consisting of $CaCO_3.MgCO_3$, $MgCO_3$ and mixtures thereof have a particle size smaller than 75 μm and larger than 3 μm, and recovering said magnesium sulfate in the form of a solution or brine from said effluents.

2. Method according to claim 1, in which the said particles selected from the group consisting of $CaCO_3.MgCO_3$ and $MgCO_3$ have a particle size such that about 100% of the particles have a particle size less than 75 μm.

3. Method according to claim 1, in which the particles selected from the group consisting of $MgCO_3$ and $CaCO_3.MgCO_3$ have a median diameter ($d_{50}$) between 3 and 30 μm.

4. Method according to claim 1, in which the particles selected from the group consisting of $MgCO_3$ and $CaCO_3.MgCO_3$ have a median diameter ($d_{50}$) between 5 and 20 μm.

5. Method according to claim 1, in which the particles selected from the group consisting of $MgCO_3$ and $CaCO_3.MgCO_3$ have a median diameter of about 10 μm.

6. Method according to claim 1, in which the particles selected from the group consisting of $MgCO_3$ and $CaCO_3.MgCO_3$ have a particle size factor at 80% greater than 1.5, said particle size factor at 80% being calculated by the following formula:

$$F_{80\%} = \frac{\varnothing_{80\%} - \varnothing_{20\%}}{(\varnothing_{80\%} + \varnothing_{20\%})/2}$$

in which $\varnothing_{80\%}$ is the upper diameter of the particles of the weight fraction passing at 80% and $\varnothing_{20\%}$ is the upper diameter of the particles of the weight fraction passing at 20%.

7. Method according to claim 1, in which the particles selected from the group consisting of $MgCO_3$ and $CaCO_3.MgCO_3$ have a particle size factor at 90% greater than 1.5, said particle size factor at 90% being calculated by the following formula:

$$F_{90\%} = \frac{\varnothing_{90\%} - \varnothing_{10\%}}{(\varnothing_{90\%} + \varnothing_{10\%})/2}$$

in which $\varnothing_{90\%}$ is the upper diameter of the particles of the weight fraction passing at 90%. and $\varnothing_{10\%}$ is the upper diameter of the particles of the weight fraction passing at 10%.

8. Method according to claim 1, in which the particles selected from the group consisting of $MgCO_3$ and $CaCO_3.MgCO_3$ have a particle size factor at 80% greater than 1.9, said particle size factor at 80% being calculated by the following formula:

$$F_{80\%} = \frac{\varnothing_{80\%} - \varnothing_{20\%}}{(\varnothing_{80\%} + \varnothing_{20\%})/2}$$

in which $\varnothing_{80\%}$ is the upper diameter of the particles of the weight fraction passing at 80%, and $\varnothing_{20\%}$ is the upper diameter of the particles of the weight fraction passing at 20%.

9. Method according to claim 1, in which the particles selected from the group consisting of $MgCO_3$ and $CaCO_3.MgCO_3$ have a particle size factor at 90% greater than 1.9, said particle size factor at 90% being calculated by the following formula:

$$F_{90\%} = \frac{\varnothing_{90\%} - \varnothing_{10\%}}{(\varnothing_{90\%} + \varnothing_{10\%})/2}$$

in which $\varnothing_{90\%}$ is the upper diameter of the particles of the weight fraction passing at 90%, and $\varnothing_{10\%}$ is the upper diameter of the particles of the weight fraction passing at 10%.

10. Method according to claim 1, in which the acid effluents are treated in a first step by means of particles selected from the group consisting of $CaCO_3.MgCO_3$ and $MgCO_3$ and in a second step by means of a compound selected from the group consisting of oxide and hydroxide of an alkaline metal and oxide and hydroxide of an alkaline-earth metal.

11. Method according to claim 10, in which the effluents are treated in the first step until a pH between 3 and 5 is reached and in the second step until a pH greater than 6 is reached.

12. Method according to claim 10, in which the effluents are treated in the first step until a pH between 3 and 5 is reached and in the second step until a pH close to 7 is reached.

13. Method according to claim 1, in which the acid effluents are treated in a first step by means of particles selected from the group consisting of $CaCO_3.MgCO_3$ and $MgCO_3$ and in a second step by means of a compound selected from the group consisting of $Ca(OH)_2$, $Mg(OH)_2$, $CaO$, $MgO$, $CaO.MgO$, $Ca(OH)_2.Mg(OH)_2$, a mixture of these, and milks of lime selected from the group consisting of milk of $Ca(OH)_2$; milk of $Mg(OH)_2$; and milk of $Ca(OH)_2.Mg(OH)_2$.

14. Method according to claim 1 in which the acid effluents are treated by means of said particles which contain at least calcium and in that the treated effluents are separated in a solid phase containing a compound selected from the group consisting of $CaSO_4$ and a $CaSO_4$ hydrate, and in a liquid phase containing $MgSO_4$.

15. Method according to claim 1, in which the $MgSO_4$ brine or solution is concentrated in order to obtain a brine or a concentrated solution.

16. Method according to claim 1:
   in which the effluents are treated by means of a suspension containing a compound selected from the group consisting of $CaCO_3.MgCO_3$ and $MgCO_3$,
   in which thereafter, the suspension is recovered,
   in which the temperature of the recovered suspension is maintained below 90° C.;
   in which the said suspension is subjected to a bubbling of an oxygenated medium, and
   in which the suspension is at least partially recycled for treating effluents.

17. Method according to claim 1:
   in which the temperature of the suspension after treatment is maintained between 50 and 90° C.;
   in which the said suspension is subjected to a bubbling of air.

18. Method according to claim 1, in which the $MgSO_4$ brine or solution is concentrated in order to obtain a compound from the group consisting of $MgSO_4$ particles and $MgSO_4$ in the form of hydrate.

19. Method of the wet treatment of effluents containing a compound selected from the group consisting of $H_2SO_4$, free $SO_2$, $SO_3^-$ or $SO_4^-$, and having a pH lower than 5, in which these effluents are reacted with a basic compound, in which particles selected from the group consisting of $CaCO_3.MgCO_3$, $MgCO_3$ and mixtures thereof, mixed with $CaCO_3$, are used for treating the said effluents, to neutralize said effluents and form magnesium sulfate the said particles having a particle size such that at least 95% of the particles selected from the group consisting of $CaCO_3.MgCO_3$, $MgCO_3$ and mixtures thereof have a particle size smaller than 75 µm and larger than 3 µm, and recovering said magnesium sulfate in the form of a solution or brine from said effluents.

20. Method according to claim 19, in which the said particles selected from the group consisting of $CaCO_3.MgCO_3$ and $MgCO_3$ have a particle size such that about 100% of the particles have a particle size less than 75 µm.

21. Method according to claim 19, in which the particles selected from the group consisting of $MgCO_3$ and $CaCO_3.MgCO_3$ have a median diameter ($d_{50}$) between 3 and 30 µm.

22. Method according to claim 19, in which the particles selected from the group consisting of $MgCO_3$ and $CaCO_3.MgCO_3$ have a median diameter ($d_{50}$) between 5 and 20 µm.

23. Method according to claim 19, in which the particles selected from the group consisting of $MgCO_3$ and $CaCO_3.MgCO_3$ have a median diameter of about 10 µm.

24. Method according to claim 19, in which the particles selected from the group consisting of $MgCO_3$ and $CaCO_3.MgCO_3$ have a particle size factor at 80% greater than 1.5, said particle size factor at 80% being calculated by the following formula:

$$F_{80\%} = \frac{\varnothing_{80\%} - \varnothing_{20\%}}{(\varnothing_{80\%} + \varnothing_{20\%})/2}$$

in which $\varnothing_{80\%}$ is the upper diameter of the particles of the weight fraction passing at 80%, and $\varnothing_{20\%}$ is the upper diameter of the particles of the weight fraction passing at 20%.

25. Method according to claim 19, in which the particles selected from the group consisting of $MgCO_3$ and $CaCO_3.MgCO_3$ have a particle size factor at 90% greater than 1.5, said particle size factor at 90% being calculated by the following formula:

$$F_{90\%} = \frac{\varnothing_{90\%} - \varnothing_{10\%}}{(\varnothing_{90\%} + \varnothing_{10\%})/2}$$

in which $\varnothing_{90\%}$ is the upper diameter of the particles of the weight fraction passing at 90%, and $\varnothing_{10\%}$ is the upper diameter of the particles of the weight fraction passing at 10%.

26. Method according to claim 19, in which the particles selected from the group consisting of $MgCO_3$ and $CaCO_3.MgCO_3$ have a particle size factor at 80% greater than 1.9 said particle size factor at 80% being calculated by the following formula:

$$F_{80\%} = \frac{\varnothing_{80\%} - \varnothing_{20\%}}{(\varnothing_{80\%} + \varnothing_{20\%})/2}$$

in which $\varnothing_{80\%}$ is the upper diameter of the particles of the weight fraction passing at 80%, and $\varnothing_{20\%}$ is the upper diameter of the particles of the weight fraction passing at 20%.

27. Method according to claim 19, in which the particles selected from the group consisting of $MgCO_3$ and $CaCO_3.MgCO_3$ have a particle size factor at 90% greater than 1.9, said particle size factor at 90% being calculated by the following formula:

$$F_{90\%} = \frac{\varnothing_{90\%} - \varnothing_{10\%}}{(\varnothing_{90\%} + \varnothing_{10\%})/2}$$

in which $\varnothing_{90\%}$ is the upper diameter of the particles of the weight fraction passing at 90%, and $\varnothing_{10\%}$ is the upper diameter of the particles of the weight fraction passing at 10%.

28. Method according to claim 19, in which the acid effluents are treated in a first step by means of particles selected from the group consisting of $CaCO_3.MgCO_3$ and $MgCO_3$ and in a second step by means of a compound selected from the group consisting of oxide and hydroxide of an alkaline metal and oxide and hydroxide of an alkaline-earth metal.

29. Method according to claim 28, in which the effluents are treated in the first step until a pH between 3 and 5 is reached and in the second step until a pH greater than 6 is reached.

30. Method according to claim 28, in which the effluents are treated in the first step until a pH between 3 and 5 is reached and in the second step until a pH close to 7 is reached.

31. Method according to claim 19, in which the acid effluents are treated in a first step by means of particles selected from the group consisting of $CaCO_3.MgCO_3$ and $MgCO_3$, mixed with $CaCO_3$, and in a second step by means of a compound selected from the group consisting of oxide and hydroxide of an alkaline metal and oxide and hydroxide of an alkaline-earth metal in which the compound selected from the group consisting of $Ca(OH)_2$, $Mg(OH)_2$, $CaO$, $MgO$, $CaO.MgO$, $Ca(OH)_2.Mg(OH)_2$, mixture of these, milk of $Ca(OH)_2$; milk of $Mg(OH)_2$; and milk of $Ca(OH)_2.Mg(OH)_2$.

32. Method according to claim 19, in which the acid effluents are treated by means of a calcium compound and in that the treated effluents are separated in a solid phase containing a compound selected from the group consisting of $CaSO_4$ and a $CaSO_4$ hydrate, and a liquid phase containing $MgSO_4$.

33. Method according to claim 19, in which the $MgSO_4$ brine and solution is concentrated in order to obtain a brine or a concentrated solution.

34. Method according to claim 19:
   in which the effluents are treated by means of a suspension containing a compound selected from the group consisting of $CaCO_3.MgCO_3$ and $MgCO_3$,
   in which the suspension is recovered after treatment,
   in which the temperature of the suspension after treatment is maintained below 90° C.;

in which the said suspension is subjected to a bubbling of an oxygenated medium, and in which the suspension for treating effluents is at least partially recycled.

35. Method according to claim 19:

in which the temperature of the suspension after treatment is maintained between 50 and 90° C.;

in which the said suspension is subjected to a bubbling of air.

36. Method according to claim 19, in which the $MgSO_4$ brine or solution is concentrated in order to obtain a compound from the group consisting of $MgSO_4$ particles and $MgSO_4$ in the form of hydrate.

* * * * *